July 19, 1949.    N. L. PEDERSEN    2,476,561
LOCKING DEVICE
Filed March 17, 1945
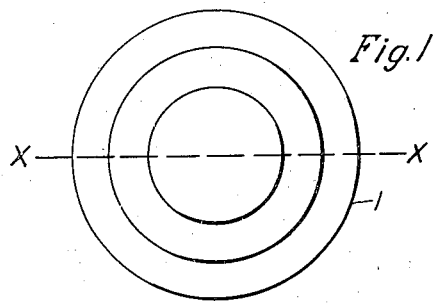
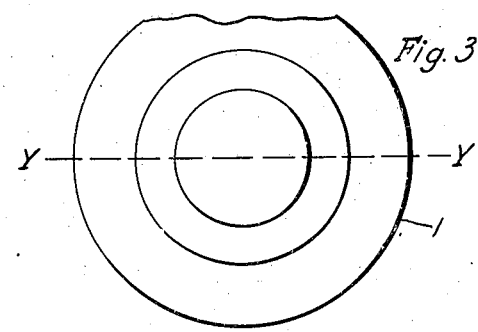
INVENTOR.
Norman Lind Pedersen Patented July 19, 1949

2,476,561

UNITED STATES PATENT OFFICE 2,476,561

LOCKING DEVICE

Norman Lind Pedersen, Los Angeles, Calif.

Application March 17, 1945, Serial No. 583,191

4 Claims. (Cl. 151—3)

This present invention relates to locking devices or lock-washers of the type which prevent the loosening of nuts.

Heretofore lock-washers have been made of an open, spiral, spring tempered steel in which a one sided pressure has been exerted against the nut. This is objectionable as the produced pressure is not great enough to prevent the loosening of the nut.

The principal object of this invention is to provide a positive locking device for bolts in which the useful pressure is fully distributed upon the nut, or the bolt head.

Another object of my invention is to provide a locking device for bolts which affords ready inspection whether the bolt or the nut has been tightened sufficiently or not.

Another object of my invention rests in the fact that the locking device will not crack open, which destroys its efficiency.

Still another object of my invention is to provide a locking device for bolts in which an initial load is applied upon the bolt that is greater than the total expected load to which the bolt is subjected when applied and whereby the working load imposed on the bolt is resiliently carried by my locking device.

My invention consists of novel features of an improved locking device hereinafter described with reference to illustrative drawings.

Other objects and advantages will become apparent as the description proceeds.

In the drawing:

Fig. 1 is a top view of my invention.

Fig. 2 is an elevational view in cross section taken along the line $x$—$x$ in Fig. 1.

Fig. 3 is a top view of a modified form of my invention.

Fig. 4 is an elevational view in cross section taken along the line $y$—$y$ in Fig. 3.

Fig. 5 is an elevational view in part cross section of my device installed under the head of a bolt.

Fig. 6 is an elevational view in part cross section of my device compressed under the head of a bolt.

Fig. 7 is an elevational view in part cross section of my device compressed under a nut.

Referring more in detail to the accompanying drawing the locking member 1 is shown having an annular hollow body of rotation arcuate in cross section formed by a semicircular side wall A and inclined end portions B and B' on the top and bottom thereof. Circular openings C and C' respectively are provided along the center of member 1 in the top portion B and the bottom portion B' circumscribing the axis of the hollow body and defining a torus shape. The flattened top and bottom portions B and B' respectively are inclined at a predetermined angle 2 as shown in Fig. 2. This angle 2 provides the means for testing the tightness of the member which is to be prevented from rotating. The thickness $t$ of the locking member 1 determines the magnitude of the locking force.

In Figs. 3 and 4 I show a modified form of the present invention, member 1 having a hollow body of rotation comprising a side wall A of oval cross section and inclined top and bottom portions B and B' respectively. The inclined prtions B and B' are not only inclined on their respective top and bottom faces but the whole thickness of the top and bottom portions 3 and 3' respectively are inclined at the predetermined angle 2 as shown, thus imparting the desired ovoid cross section to the wall of the locking member.

In Fig. 5, an installed locking member 1 is shown having a bolt 4 passing through the openings of member 1. The bolt head 5 is just touching the locking member 1, which leaves a gap 6 between the underside of the bolt head 5 and the top face of the locking device 1. Another gap 7 between the bottom face of member 1 and the top face of a flange 8 is shown. Both gaps are formed by the inclined portions B and B' respectively.

In Fig. 6, a member 1 is shown fully compressed having its inclined portions B and B' respectively in a horizontal position. This closes the gap 6 at Z between the lower side of the bolt head 5, and the upper portion B of member 1. Also gap 7 is closed at Z' between the lower portion B' and the top face of flange 8.

A flat feeler gage may be passed below the bolt head 5 or below member 1, when testing for the tightness of the installation. Should the feeler gage enter a gap the operator will notice it quickly and tighten the nut or bolt further until the gap is closed.

When both gaps 6 and 7 respectively are fully closed the installation is completed.

In Fig. 7, another installation is shown in which a nut 10 is prevented from turning.

The locking device may be made of highly resilient material and may be compressed until the inclined portions B and B' respectively are fully flattened as shown in Figs. 6 and 7.

In order to allow for circumferential stretch of the side walls A without material loss of tension and at the same time permit ready compression of the top and bottom walls the walls A are formed of varying thickness, being thickest at their circumferential mid portions and tapering with decreasing thickness to their intersection with the inclined inner marginal portions B and B'.

This full compression provides an initial load in the bolt by tightening against my locking device. The locking device is dimensioned in accordance with the requirements of a particular application; its wall thickness and the angle of inclination of its top and bottom portions B and B' being predetermined so that when the portions B and B' are compressed to bring the inclined portions to the horizontal and in parallel relation to each other the device will exert an axial thrust which is greater than the actual load to be carried by the bolt to which it is applied thus reducing the range of stress in the bolt. As is known, a loose bolt receives innumerable shock loads which tend to deteriorate the material of which the bolt is made. When using my locking device the initial load on the bolt is carried by the semi-circular section of my device, which eliminates the shock loads upon the bolt. A positive lock is thereby provided which may never collapse under the influence of the pressure applied.

From the foregoing description, it will be seen that a highly efficient lock washer is herewith provided and this lock washer is of particular importance in its use on all machines and devices which depend upon the security of the provided bolts. It is to be understood that minor changes in the details of construction may be made without departing from the scope of the invention as set forth in the appended claims.

I claim:

1. A resilient lock washer having a hollow shape of rotation, arcuate in cross-section, a hole through the ends circumscribing the axis and defining a torus shape, the ends being inclined so as to be flat when flexed in use.

2. The washer of claim 1 in which the cross-section is substantially semi-circular.

3. The washer of claim 1 in which the cross-section is oval.

4. A resilient lock washer having a hollow shape of rotation with a side wall of arcuate cross section having a wall thickness tapering from its mid portion toward its end portions and having inclined top and bottom portions intersecting and formed in continuation of said side wall formed with openings circumscribing the axis of the washer and defining a torus shape; said inclined top and bottom portions extending flat when the washer is compressed in use.

NORMAN LIND PEDERSEN.

REFERENCES CITED

The following references are of record in the file of this patent:

UNITED STATES PATENTS

| Number | Name | Date |
|---|---|---|
| 63,021 | Collins | Mar. 19, 1867 |
| 840,791 | Mohring | Jan. 8, 1907 |
| 1,504,511 | Ross | Aug. 12, 1924 |
| 2,391,902 | Hosking | Jan. 1, 1946 |